United States Patent
Hill et al.

(10) Patent No.: US 7,333,426 B1
(45) Date of Patent: Feb. 19, 2008

(54) REDUNDANT INVERSE MULTIPLEXING OVER ATM (IMA)

(75) Inventors: Kay N. Hill, Apex, NC (US); James Wesselkamper, Apex, NC (US); William T. Marcheck, Durham, NC (US)

(73) Assignee: Nortel Networks Limited, St. Laurent (CA)

( * ) Notice: Subject to any disclaimer, the term of this patent is extended or adjusted under 35 U.S.C. 154(b) by 1096 days.

(21) Appl. No.: 10/260,194

(22) Filed: Sep. 30, 2002

(51) Int. Cl.
*H04J 1/16* (2006.01)
*H04J 3/14* (2006.01)
*H04L 12/28* (2006.01)
*H04L 12/56* (2006.01)

(52) U.S. Cl. .................. 370/219; 370/535; 370/395.1
(58) Field of Classification Search .................. None
See application file for complete search history.

(56) References Cited

U.S. PATENT DOCUMENTS

| | | | |
|---|---|---|---|
| 6,680,904 B1 * | 1/2004 | Kaplan et al. .............. 370/217 |
| 6,834,038 B1 * | 12/2004 | Zelig et al. .................. 370/217 |
| 6,973,501 B1 * | 12/2005 | Harris et al. ................ 709/232 |
| 6,985,503 B1 * | 1/2006 | DeGrandpre et al. ....... 370/536 |
| 7,046,623 B2 * | 5/2006 | Kukic ......................... 370/228 |
| 2002/0021661 A1 * | 2/2002 | DeGrandpre et al. ....... 370/219 |

* cited by examiner

*Primary Examiner*—Chirag G. Shah
(74) *Attorney, Agent, or Firm*—Withrow & Terranova, P.L.L.C.

(57) ABSTRACT

The present invention provides redundant, inverse multiplexing over ATM (R-IMA). An ATM control system may include line interface circuitry, transmission convergence logic, IMA logic, and a cross-connect coupling the IMA logic of the redundant ATM control systems to control activity. The line interface circuitry terminates n DSx lines and is adapted to receive n incoming ATM over DSx traffic streams and transmit n outgoing ATM over DSx traffic streams corresponding to the n DSx lines. The transmission convergence logic is adapted to recover incoming ATM cell streams from the incoming ATM over DSx streams and generate the outgoing ATM over DSx traffic streams to form n outgoing ATM cell streams. The IMA logic is adapted to combine the incoming n ATM cell streams to form an incoming combined ATM cell stream, and distribute ATM cells from an outgoing combined ATM cell stream to create the n outgoing ATM cell streams.

32 Claims, 2 Drawing Sheets

REDUNDANT INVERSE MULTIPLEXING OVER ATM (IMA)

FIELD OF THE INVENTION

The present invention relates to incorporating inverse multiplexing over ATM (IMA) technology, and in particular, providing redundant IMA for supporting both voice and data transmission to customer premise equipment.

BACKGROUND OF THE INVENTION

With the growing number of remote local area networks (LANs) that require linking to central locations over wide area networks (WANs), and the ever-increasing demand for on-line services and data-intensive applications, there is a growing need for high bandwidth WAN access. Increasing bandwidth requirements and delay constraints imposed by real-time-interactive applications such as video conferencing, audio and video streaming, and basic telephony, dictate that WAN access maintain high levels of integrity.

To provide such integrity, asynchronous transfer mode (ATM) has become the technology of choice for maintaining integrity and reducing the complexity of WAN communications. ATM offers many benefits, including speed, scalability, traffic management, and the capability to combine LAN and WAN functions through a uniform protocol. Unfortunately, as enterprises require greater WAN access to support ever-increasing traffic loads, they are faced with either paying for very expensive T3 or E3 links that often go substantially unused, or adding additional T1 or E1 access lines, which often create multiple, parallel networks.

Inverse multiplexing over ATM (IMA) offers a solution to the above paradigm. IMA is a user-to-network interface standard approved by the ATM Forum in 1997, and specifies a transmission method in which ATM cells are distributed across multiple T1 or E1 lines, then reassembled at a terminating point while maintaining the original order of the ATM cells. By facilitating the transport of ATM cells over more cost-effective T1 and E1 lines, IMA facilitates the extension of ATM to areas having access to T1 or E1 lines. Thus, in situations where an application was limited to the 1.544 megabits per second provided by a T1 line, multiple T1 lines may be used to incrementally increase the unified traffic flow in a scalable fashion.

Unfortunately, IMA is data-focused, and does not incorporate the required redundancy for traditional telephone. Traditional telephone networks, such as the public switched telephone network (PSTN), require redundancy throughout the network and will not tolerate single points of failure. Thus, traditional telephony applications have not been able to take advantage of the bandwidth and scalability provided by IMA. Accordingly, there is a need for a way to provide redundancy in an IMA architecture to extend the benefits of IMA to voice telephony.

SUMMARY OF THE INVENTION

The present invention provides redundant, inverse multiplexing over ATM (R-IMA). An ATM control system may include line interface circuitry, transmission convergence logic, IMA logic, and a cross-connect coupling the IMA logic of the redundant ATM control systems to control activity. The line interface circuitry terminates n DSx lines and is adapted to receive n incoming ATM over DSx traffic streams and transmit n outgoing ATM over DSx traffic streams corresponding to the n DSx lines. The transmission convergence logic is adapted to recover incoming ATM cell streams from the incoming ATM over DSx streams and generate the outgoing ATM over DSx traffic streams to form n outgoing ATM cell streams. The IMA logic is adapted to combine the incoming n ATM cell streams to form an incoming combined ATM cell stream, and distribute ATM cells from an outgoing combined ATM cell stream to create the n outgoing ATM cell streams.

In particular, the cross-connect facilitates direct or indirect communications between the IMA logic of each ATM control system to control switching between active and inactive states and provide limited information to help maintain synchronous operation of each ATM control system and its corresponding IMA logic. The ATM control systems operate regardless of being active or inactive, and operate synchronously to minimize the impact of switching activity in the event of a fault on the active ATM control system.

When a fault occurs on the active ATM control system, the IMA logic of the active control system will send a switch of activity message to the IMA logic of the inactive control system and transition from an active to an inactive state, preferably upon receiving confirmation of receipt of the switch of activity message from the inactive ATM control system. The inactive ATM control logic is configured to receive the switch of activity message from the active ATM control system and transition to the active state. As noted, the inactive ATM control system may send confirmation of receipt of the switch of activity message prior to transitioning to an active state.

Each ATM control system will preferably include control logic cooperating with the IMA logic to control activity of the ATM control system. Preferably, a transmit function in the line interface circuitry is selectively operable, and the control logic is adapted to activate the transmit function when the ATM control system is active and deactivate the transmit function when the ATM control system is inactive. Further, the DSx lines may be wire-ORed between the line interface circuitry of each ATM control system.

The ATM control system may also include ATM switch logic adapted to receive and combine voice-based ATM cells from a telephony processor and data-based ATM cells from a telephony interface to form the outgoing combined ATM cell stream. The switch logic will also receive the incoming combined ATM cell stream and send voice-based ATM cells contained therein to the telephony processor and data-based ATM cells contained therein to the telephony interface. The telephony processor is adapted to receive and convert the voice signals from the telephony interface to voice-based ATM cells for the switch logic of the ATM control system. The telephony processor is also adapted to receive and convert the voiced-based ATM cells from the switch logic of the ATM control system to voice signals for the telephony interface.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
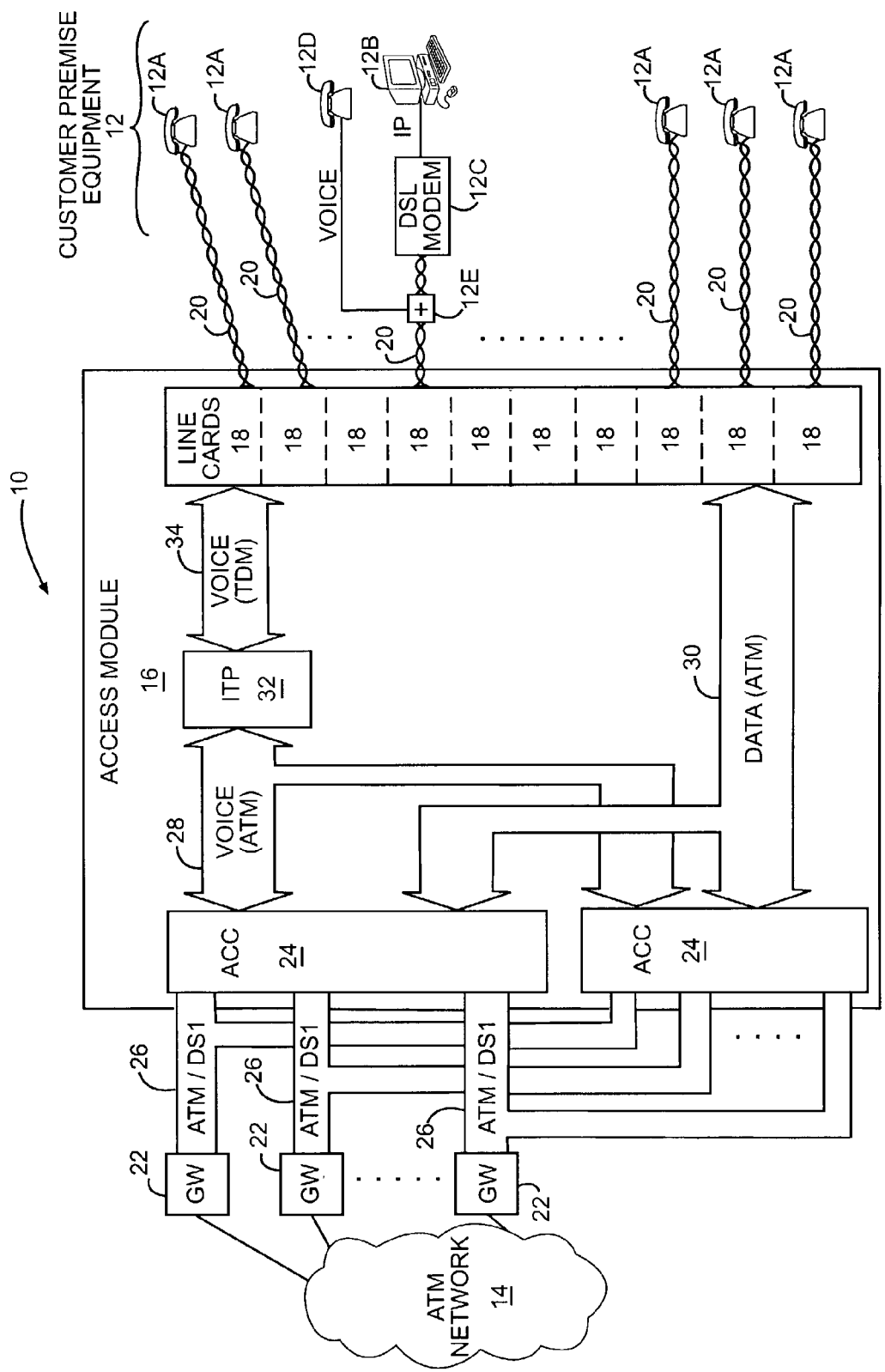
FIG. 1 is a block representation of an access network according to one embodiment of the present invention.

With reference to FIG. 1, a communication environment 10 is illustrated wherein various customer premise equipment (CPE) 12 is provided access to an ATM network 14 via an access module 16. Each CPE 12 is directly or indirectly coupled to a line card 18 via an analog-based telephone line 20, which is typically copper-based twisted pair wire. The line cards 18 may support analog voice, modulated data, or a combination thereof, depending on the CPE 12. For example, telephones 12A may provide traditional voice and DTMF tones to facilitate bi-directional communications with the line cards 18. Alternatively, the telephone lines 20 may support various data access technologies. A computer 12B may be connected to a line card 18 via a modem 12C, such as a digital subscriber line (DSL) modem 12C, to facilitate a data connection between the computer 12B and the corresponding line card 18. Mixing or summation circuitry 12E may be provided in association with the DSL modem 12C to allow voice from another telephone 12D to share bandwidth with the data provided by the computer 12B. For the purposes of description, assume that each of the telephone lines 20 is a digital subscriber line. Those of ordinary skill in the art will recognize the various configurations the telephone lines 20 may take.

On the opposite side of the access module 16, one or more gateways (GWs) 22, which lead to the ATM network 14, are redundantly coupled to ATM control cards (ACCs) 24 via DS1 links 26. The DS1 links 26 support DS1 or E1 services, and in particular, support ATM over DS1 or E1. When supporting voice and data, the traffic sent to and received from the ATM network 14 via the gateways 22 and the DS1 links 26 will include both voice and data traffic, which is broken into voice over ATM traffic 28 and data over ATM traffic 30. The data over ATM traffic 30 is switched to the appropriate line card 18, which will recover the data and send it to the appropriate customer premise equipment 12 via the associated digital subscriber line 20. The voice over ATM traffic 28 is sent over a redundant ACC 24 to an internet telephone processor (ITP) 32, which will recover the voice signal, provide any signal processing required for the voice signal, and send the signals to the appropriate line card 18, which will forward the voice signals to the CPE 12 via the associated digital subscriber line 20. For traffic sent from the CPEs 12 to the ATM network 14, the line cards 18 will send the voice signals to the ITP 32 for signal processing, and then multiplex the digitized voice into ATM cells, which are streamed to the ACC 24. The ACC 24 will forward the cells to the ATM network 14 via the gateways 22 and the DS1 links 26. The line cards 18 will convert any data received from the CPEs 12 and forward the streams of ATM cells to the redundant ACCs 24. The active one of the two redundant ACCs 24 will send the voice and data ATM cells to the ATM network 14 via the gateways 22 and the DS1 links 26.

Preferably, the ACCs 24 implement inverse multiplexing over ATM (IMA), wherein the ATM cells for any given application or combination of applications are fanned out across multiple DS1 links, and then reassembled at the receiving end on the opposite side of the ATM network 14 in the original order in which they were transmitted. Thus, the bandwidth of multiple ones of the DS1 links 26 can be shared to provide a fat ATM pipe, or gateway to the ATM network 14 and beyond. Thus, ATM access can be extended to the access module 16 to provide high bandwidth, high speed access to an ATM network 14 for customer premise equipment 12 in an efficient and effective manner.

Figure 2:
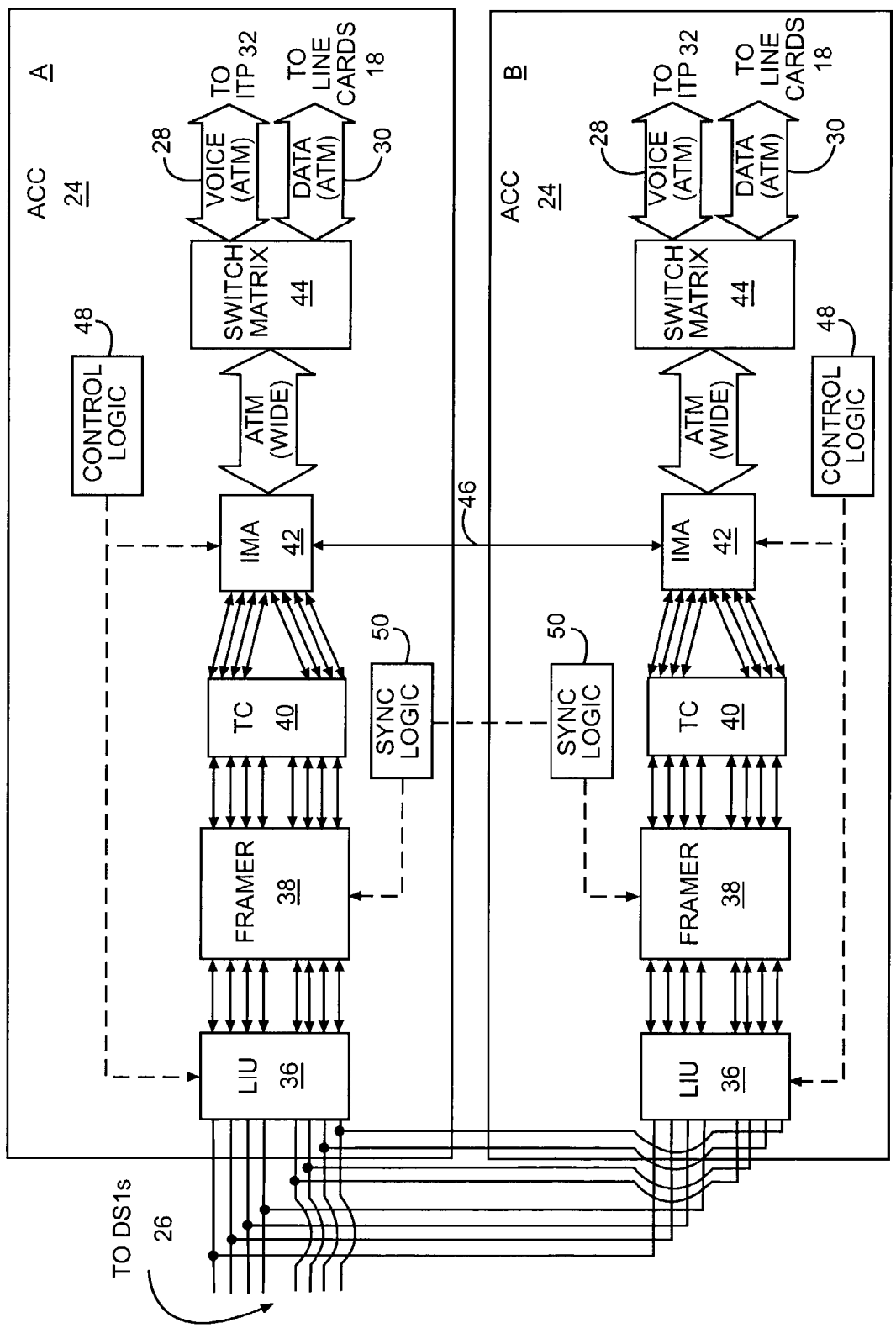
FIG. 2 is a block representation of an ATM control card used in an access module of one embodiment of the present invention.

In an effort to provide the redundancy required for voice telephony, the ACCs 24 operate in a redundant fashion, the details of which are disclosed in association with FIG. 2. The redundant ACCs 24 illustrated in FIG. 2 each include a line interface unit (LIU) 36, framer logic 38, transmission convergence (TC) logic 40, IMA logic 42, and a switch matrix 44. The LIUs 36 provide the physical interface to the DS1 links 26. Each DS1 link 26 is "wire-ORed" to the LIUs 36 on both ACCs 24. For transmission, only the LIU 36 of the active ACC 24 will transmit; however, for reception, ATM over DS1 traffic is received simultaneously by the LIUs 36 on both the active and inactive ACCs 24. During reception, the ATM over DS1 traffic is received by the LIUs 36 and sent to the framer logic 38, which will forward the ATM over DS1 traffic to the transmission convergence logic 40, which will recover the ATM traffic and forward the individual streams to the IMA logic 42. The IMA logic 42 will effectively recombine the ATM cells recovered from each of the DS1 links in the order in which they originated, and send the resultant ATM stream to the switch matrix 44. Based on the type of information in the ATM cells and their respective destinations, the switch matrix 44 will direct the ATM cells either to the IPT 32 (for voice traffic 28) or directly to the corresponding line cards 18 (for data traffic 30).

For traffic destined for the ATM network 14 from the CPE 12, voice over ATM traffic 28 will enter the switch matrix 44 from the ITP 32 and be directed over a high bandwidth ATM line to the IMA logic 42, which will multiplex the incoming stream of ATM cells from the switch matrix 44 to the various channels in the transmission convergence logic 40 corresponding to the DS1 links 26. The transmission convergence logic 40 will layer the ATM cells on DS1 signaling and send the resultant ATM over DS1 signal to the framer logic 38, which will synchronize the corresponding DS1 frames and present the synchronized, ATM over DS1 signal to the LIU 36, which will forward the corresponding ATM over DS1 signals to the respective DS1 links 26, if the LIU 36 is in an active ACC 24. If the LIU 36 is in an inactive ACC 24, the ATM over DS1 signals are not transmitted over the DS1 links 26. Thus, the outgoing traffic originating from the CPEs 12 is combined over a wide bandwidth ATM link between the switch matrix 44 and the IMA 42 prior to being spread across multiple DS1 links 26. The ATM over DS1 traffic will be sent across the ATM network 14 to a corresponding access module 16, wherein the respective ATM over DS1 signals will be recombined such that the ATM traffic can be recovered, and ultimately the voice and data carried therein can be recovered and directed to the appropriate networks or other CPEs 12.

As noted, the ACCs 24 are provided in pairs to provide redundancy in case one of the ACCs 24 fails. In an effort to minimize the impact of one of the ACCs 24 failing and the process of switching activity to the inactive ACC 24, the IMAs 42 of both ACCs 24, regardless of activity, are synchronized. In the event of a fault on the active ACC 24, activity can be switched quickly and cleanly enough that the impact on voice or data is negligible, or at least minimized. Since the DS1 links 26 are shared in a wired-OR configuration, incoming DS1 frames arrive synchronously, which eliminates the need to separately synchronize the receiving side of the IMA 42. At least one cross-connect 46 is provided between the IMAs 42 of the two ACCs 24 to allow the inactive IMA 42 to be synchronized in hardware to the active IMA 42. Thus, the cross-connects 46 operate to synchronize the IMAs 42 for transmission across the DS1s 26 to the ATM network 14. In this transmit direction, the IMAs 42 will cooperate with control logic 48 to disable the LIU 36 in the inactive ACC 24 to prevent it from transmitting information toward the ATM network 14.

Further, each ACC 24 may include some form of synchronization logic 50 for the framer logic 38 to ensure outgoing frames to the DS1s 26 are internally synchronized, although the DS1 frames would not be transmitted by the LIU 36 on the inactive ACC 24. The synchronization logic 50 may run off of a highly accurate reference frequency, or may be tied to external signaling from the network or from a timing system, such as a GPS.

When a fault occurs on the active ACC 24 (A), the control logic 48 for the active ACC 24 (A) will request the control logic 48 of the inactive ACC 24 (B) to assume activity. When the inactive ACC's control logic 48 acknowledges the request, the active ACC's control logic 48 will disable the transmit side of its LIU 36, and the inactive ACC's control logic 48 will activate the transmit function of its LIU 36. As such, the formerly inactive ACC 24 (B) becomes active, and vice versa. The switch control signaling may take place and be initiated in software or hardware, depending on the nature of the failure. Those skilled in the art will recognize the various techniques for monitoring various types of faults throughout the ACCs 24 and providing signaling between the ACCs 24 in hardware or software to facilitate a switch of activity.

In an effort to keep the IMAs 42 synchronized, the amount of information necessary to swap between ACCs 24, and in particular between the IMAs 42, during a switch of activity is minimized. As such, state machines, counters, and the like implemented in the IMAs 42 and the control logic 48 independently run in a synchronous fashion, regardless of the state of activity.

During operation, certain information is provided between the IMAs 42, and in particular from the active IMA 42 to the inactive IMA 42 to help in fault detection as well as maintaining synchronization. Various state information bearing on IMA frame sequence numbers and link transmit states, along with status control information, are provided to the inactive IMA 42 via the cross-connect 46. The inactive IMA 42, alone or in conjunction with the control logic 48, processes the information provided by the active IMA 42, and if errors are detected, the inactive IMA 42 or control logic 48 may signal the active ACC 24 to trigger a switch of activity or request information explaining any perceived errors. Thus, when an inactive IMA 42 switches to an active state, the active IMA 42 will switch from a receive mode to a transmit mode to provide the error detection and synchronization information, while the newly inactive IMA 42 will switch from a transmit mode to a receive mode over the cross-connect 46.

Those skilled in the art will recognize improvements and modifications to the preferred embodiments of the present invention. For example, the line cards may support any digital services format, including DS3, and analog and digital telephony line types. Similarly, the present invention is described in relation to U.S. standards, but is equally applicable to European standards. Thus, the present invention is equally applicable to lines capable of providing E1 services instead of T1 services. All such improvements and modifications are considered within the scope of the concepts disclosed herein and the claims that follow.

What is claimed is:

1. An asynchronous transfer mode (ATM) control system comprising:
   a) line interface circuitry for terminating n DSx lines and adapted to receive n incoming ATM over DSx traffic streams and transmit n outgoing ATM over DSx traffic streams corresponding to the n DSx lines;
   b) transmission convergence logic adapted to recover n incoming ATM cell streams from the n incoming ATM over DSx streams and generate the n outgoing ATM over DSx traffic streams to form n outgoing ATM cell streams;
   c) inverse multiplexing over ATM (IMA) logic adapted to combine the incoming n ATM cell streams to form an incoming, combined ATM cell stream and distribute ATM cells from an outgoing, combined ATM cell stream to create the n outgoing ATM cell streams; and
   d) a cross-connect adapted to operatively couple the IMA logic to redundant IMA logic in a redundant ATM control system to control switching between active and inactive states,
   wherein the IMA logic is further adapted to:
   a) send a switch of activity message to the redundant IMA logic and transition from the active to the inactive state when a fault is detected in the ATM control system; and
   b) receive the switch of activity message from the redundant IMA logic when in the inactive state and transition to the active state.

2. The ATM control system of claim 1 wherein the IMA logic and the redundant IMA logic synchronously operate.

3. The ATM control system of claim 1 wherein the IMA logic and the redundant IMA logic are adapted to communicate with one another via the cross-connect to maintain synchronous operation with one another when in the active and inactive states.

4. The ATM control system of claim 1 wherein the ATM control system operates in either the active or inactive state, the transmission convergence logic and the IMA logic process the cell and traffic streams regardless of operating in the active or inactive states, and the line interface circuitry only transmits the n outgoing ATM over DSx traffic streams when the ATM control system operates in the active state.

5. The ATM control system of claim 1 further comprising control logic associated with the IMA logic and adapted to cooperate with the IMA logic to control activity of the ATM control system.

6. The ATM control system of claim 5 wherein a transmit function in the line interface circuitry is selectively operable and the control logic is further adapted to activate the transmit function when the ATM control system is in the active state and deactivate the transmit function when the ATM control system is in the inactive state.

7. The ATM control system of claim 1 wherein the DSx lines are wire-ORed between the line interface circuitry and redundant line interface circuitry of a redundant ATM control system.

8. An asynchronous transfer mode (ATM) control system comprising:
   a) line interface circuitry for terminating n DSx lines and adapted to receive n incoming ATM over DSx traffic streams and transmit n outgoing ATM over DSx traffic streams corresponding to the n DSx lines;
   b) transmission convergence logic adapted to recover n incoming ATM cell streams from the n incoming ATM over DSx streams and generate the n outgoing ATM over DSx traffic streams to form n outgoing ATM cell streams;
   c) inverse multiplexing over ATM (IMA) logic adapted to combine the incoming n ATM cell streams to form an incoming, combined ATM cell stream and distribute ATM cells from an outgoing, combined ATM cell stream to create the n outgoing ATM cell streams;
   d) a cross-connect adapted to operatively couple the IMA logic to redundant IMA logic in a redundant ATM control system to control switching between active and inactive states; and
   e) framer logic between the transmission convergence logic and the line interface circuitry to synchronize the DSx frames in the n outgoing ATM over DSx traffic streams.

9. The ATM control system of claim 8 wherein the framer logic is associated with synchronization logic adapted to facilitate synchronization of DSx frames between the framer logic and redundant framer logic in the redundant ATM control system.

10. The ATM control system of claim 1 wherein the DSx lines are DS1 lines.

11. The ATM control system of claim 1 further comprising ATM switch logic adapted to:
   a) receive and combine voice-based ATM cells from a telephony processor and data-based ATM cells from a telephony interface to form the outgoing, combined ATM cell stream; and
   b) receive the incoming, combined ATM cell stream and send voice-based ATM cells in the incoming, combined ATM cell stream to the telephony processor and data-based ATM cells in the incoming, combined ATM cell stream to the telephony interface.

12. An access module comprising:
   a) a telephone interface adapted to:
      i) receive data signals or voice signals from customer premise equipment; and
      ii) convert the data signals to data-based ATM cells;
   b) a telephony processor adapted to receive and convert the voice signals from the telephony interface to voice-based ATM cells;
   c) two asynchronous transfer mode (ATM) control systems, each comprising:
      i) line interface circuitry for terminating n DSx lines and adapted to receive n incoming ATM over DSx traffic streams and transmit n outgoing ATM over DSx traffic streams corresponding to the n DSx lines;
      ii) transmission convergence logic adapted to recover n incoming ATM cell streams from the n incoming ATM over DSx streams and generate the n outgoing ATM over DSx traffic streams to form a n outgoing ATM cell streams;
      iii) inverse multiplexing over ATM (IMA) logic adapted to combine the incoming n ATM cell streams to form an incoming, combined ATM cell stream and distribute ATM cells from an outgoing, combined ATM cell stream to create the n outgoing ATM cell streams; and
      iv) ATM switch logic adapted to:
         (1) receive and combine the voice-based ATM cells from the telephony processor and the data-based ATM cells from the telephony interface to form the outgoing, combined ATM cell stream; and
         (2) receive the incoming, combined ATM cell stream and send voice-based ATM cells in the incoming, combined ATM cell stream to the telephone processor and data-based ATM cells in the incoming, combined ATM cell stream to the telephony interface; and
   d) a cross-connect adapted to operatively couple the IMA logic of the ATM control systems to control switching between active and inactive states, the telephony processor further adapted to receive and convert the voiced-based ATM cells from the ATM control system to voice signals for the telephony interface.

13. The access module of claim 12 wherein the ATM control systems synchronously operate.

14. The access module of claim 12 wherein the IMA logic for the ATM control systems are adapted to communicate with one another via the cross-connect to maintain synchronous operation with one another when in the active and inactive states.

15. The access module of claim 12 wherein each ATM control system operates in either the active or inactive state, the transmission convergence logic and the IMA logic process the cell and traffic streams regardless of operating in the active or inactive states, and the line interface circuitry only transmits the n outgoing ATM over DSx traffic streams when the associated ATM control system operates in the active state.

16. The access module of claim 12 wherein the IMA logic for each ATM control system is further adapted to:
   a) send a switch of activity message to the other of the IMA logic and transition from the active to the inactive state when a fault is detected; and
   b) receive the switch of activity message from the other of the IMA logic when in the inactive state and transition to the active state.

17. The access module of claim 12 further comprising control logic associated with the IMA logic and adapted to cooperate with the IMA logic to control activity of the ATM control system.

18. The access module of claim 17 wherein a transmit function in each of the line interface circuitry is selectively operable and each control logic is further adapted to activate the transmit function when the associated ATM control system is in the active state and deactivate the transmit function when the associated ATM control system is in the inactive state.

19. The access module of claim 12 wherein the DSx lines are wire-ORed between the line interface circuitry of the ATM control systems.

20. The access module of claim 12 wherein each ATM control system further comprises framer logic between the transmission convergence logic and the line interface circuitry to synchronize DSx frames in the n outgoing ATM over DSx traffic streams.

21. The access module of claim 20 wherein the framer logic is associated with synchronization logic adapted to facilitate synchronization of DSx frames between the framer logic of the ATM control systems.

22. The access module of claim 12 wherein the DSx lines are DS1 lines.

23. An asynchronous transfer mode (ATM) control system comprising:
 a) means for terminating n DSx lines, said means adapted to receive n incoming ATM over DSx traffic streams and transmit n outgoing ATM over DSx traffic streams corresponding to the n DSx lines;
 b) means for recovering n incoming ATM cell streams from the n incoming ATM over DSx streams and generating the n outgoing ATM over DSx traffic streams to form n outgoing ATM cell streams;
 c) inverse multiplexing over ATM (IMA) logic means for combining the incoming n ATM cell streams to form an incoming, combined ATM cell stream and distribute ATM cells from an outgoing, combined ATM cell stream to create the n outgoing ATM cell streams; and
 d) means for operatively coupling the IMA logic means to redundant IMA logic in a redundant ATM control system to control switching between active and inactive states;
 wherein the IMA logic means is further adapted to:
 a) send a switch of activity message to the redundant IMA logic and transition from the active to the inactive state when a fault is detected in the ATM control system; and
 b) receive the switch of activity message from the redundant IMA logic when in the inactive state and transition to the active state.

24. The ATM control system of claim 23 wherein the IMA logic means and the redundant IMA logic synchronously operate.

25. The ATM control system of claim 23 wherein the IMA logic means and the redundant IMA logic are adapted to communicate with one another to maintain synchronous operation with one another when in the active and inactive states.

26. The ATM control system of claim 23 wherein the ATM control system operates in either the active or inactive state and the line interface circuitry only transmits the n outgoing ATM over DSx traffic streams when the ATM control system operates in the active state.

27. The ATM control system of claim 23 further comprising control logic associated with the IMA logic means and adapted to cooperate with the IMA logic means to control activity of the ATM control system.

28. The ATM control system of claim 27 wherein a transmit function in the means for terminating is selectively operable and the control logic is further adapted to activate the transmit function when the ATM control system is in the active state and deactivate the transmit function when the ATM control system is in the inactive state.

29. The ATM control system of claim 23 wherein the DSx lines are wire-ORed between the means for terminating and redundant means for terminating of a redundant ATM control system.

30. The ATM control system of claim 23 wherein the DSx lines are DS1 lines.

31. The ATM control system of claim 23 further comprising means for:
 a) receiving and combining voice-based ATM cells from a telephony processor and data-based ATM cells from a telephony interface to form the outgoing, combined ATM cell stream; and
 b) receiving the incoming, combined ATM cell stream and sending voice-based ATM cells in the incoming, combined ATM cell stream to the telephony processor and data-based ATM cells in the incoming, combined ATM cell stream to the telephony interface.

32. A method comprising:
 a) terminating n DSx lines and adapted to receive n incoming ATM over DSx traffic streams and transmit n outgoing ATM over DSx traffic stream corresponding to the n DSx lines;
 b) recovering n incoming ATM cell streams from the n incoming ATM over DSx streams and generating the n outgoing ATM over DSx traffic streams to form n outgoing ATM cell streams;
 c) combining the incoming n ATM cell streams to form an incoming, combined ATM cell stream and distribute ATM cells from an outgoing, combined ATM cell stream to create the n outgoing ATM cell streams in inverse multiplexing over ATM (IMA) logic; and
 d) switching between active and inactive states between the IMA logic and redundant IMA logic in a redundant ATM control system,
 wherein the switching step further comprises:
 i) sending a switch of activity message to the redundant IMA logic and transitioning from the active to the inactive state when a fault is detected in the ATM control system; and
 ii) receiving the switch of activity message from the redundant IMA logic when in the inactive state and transitioning to the active state.

* * * * *

UNITED STATES PATENT AND TRADEMARK OFFICE
CERTIFICATE OF CORRECTION

| | | |
|---|---|---|
| PATENT NO. | : 7,333,426 B1 | Page 1 of 1 |
| APPLICATION NO. | : 10/260194 | |
| DATED | : February 19, 2008 | |
| INVENTOR(S) | : Hill et al. | |

It is certified that error appears in the above-identified patent and that said Letters Patent is hereby corrected as shown below:

In Column 1, Line 47, delete "telephone." and insert -- telephony. --, therefor.

In Column 3, Line 57, delete "telephone" and insert -- telephony --, therefor.

In Column 4, Line 41, delete "IPT" and insert -- ITP --, therefor.

In Column 7, Line 48, in Claim 12, delete "telephone" and insert -- telephony --, therefor.

In Column 7, Line 64, in Claim 12, delete "a n" and insert -- n --, therefor.

Signed and Sealed this
Twenty-third Day of August, 2011

David J. Kappos
*Director of the United States Patent and Trademark Office*